United States Patent
Fassett et al.

(10) Patent No.: US 8,005,827 B2
(45) Date of Patent: Aug. 23, 2011

(54) SYSTEM AND METHOD FOR ACCESSING PREFERRED PROVIDER OF AUDIO CONTENT

(75) Inventors: Ethan Fassett, San Francisco, CA (US); John Thrall, San Francisco, CA (US)

(73) Assignee: Yahoo! Inc., Sunnyvale, CA (US)

(*) Notice: Subject to any disclaimer, the term of this patent is extended or adjusted under 35 U.S.C. 154(b) by 345 days.

(21) Appl. No.: 11/499,057

(22) Filed: Aug. 3, 2006

(65) Prior Publication Data

US 2007/0033199 A1    Feb. 8, 2007

Related U.S. Application Data

(60) Provisional application No. 60/705,735, filed on Aug. 3, 2005.

(51) Int. Cl.
*G06F 7/00* (2006.01)
*G06F 17/30* (2006.01)

(52) U.S. Cl. ......... 707/726; 707/722; 707/723; 707/732

(58) Field of Classification Search .............. 707/3, 722, 707/723, 726, 732
See application file for complete search history.

(56) References Cited

U.S. PATENT DOCUMENTS

| | | | | |
|---|---|---|---|---|
| 6,093,880 A * | 7/2000 | Arnalds | ....................... | 84/464 R |
| 6,640,210 B1 * | 10/2003 | Schaefer et al. | .............. | 704/235 |
| 2004/0177122 A1 * | 9/2004 | Appelman et al. | ............. | 709/206 |
| 2005/0177379 A1 * | 8/2005 | Gaik | ................... | 705/1 |
| 2006/0253436 A1 * | 11/2006 | Cook et al. | ......................... | 707/3 |
| 2006/0278064 A1 * | 12/2006 | Lourdeaux | ..................... | 84/609 |

* cited by examiner

*Primary Examiner* — Apu M Mofiz
*Assistant Examiner* — Jared M Bibbee
(74) *Attorney, Agent, or Firm* — Seth H. Ostrow; Ostrow Kaufman LLP

(57) ABSTRACT

The present invention provides systems, methods and computer-readable media comprising program code for affording access to a preferred provider of audio content. A method according to one embodiment of the present invention for presenting a control to navigate to a server for a preferred provider of audio content comprises identifying a link to an item of audio content in a result set generated in response to a search by the given user for one or more items of audio content. A preferred audio provider is determined for a given user and whether the item of audio content is available at the preferred audio provider for the given user. If the item of audio content is available at the preferred audio provider, a control is presented to navigate to a server of the preferred provider from which the user may download or stream the item of audio content.

24 Claims, 11 Drawing Sheets

SYSTEM AND METHOD FOR ACCESSING PREFERRED PROVIDER OF AUDIO CONTENT

The present application claims the benefit of U.S. Provisional application Ser. No. 60/705,735, entitled "AUDIO SEARCH SYSTEMS AND METHODS," filed Aug. 3, 2005, the disclosure of which is hereby incorporated by reference in its entirety.

COPYRIGHT NOTICE

A portion of the disclosure of this patent document contains material which is subject to copyright protection. The copyright owner has no objection to the facsimile reproduction by anyone of the patent document or the patent disclosure, as it appears in the Patent and Trademark Office patent files or records, but otherwise reserves all copyright rights whatsoever.

BACKGROUND OF THE INVENTION

The present invention generally provides methods and systems for facilitating the identification of audio files. More specifically, the present invention provides methods and systems that facilitate the search and retrieval of audio files, such as music files, from both paid providers of audio content as well as available freely on the Internet.

A number of techniques are known to those of skill in the art for delivering audio content to users. Providers of audio content maintain the audio content in one or more data stores and maintain detailed information that describes the audio content. For example, Apple Computer, Inc. provides the iTunes Music Store that allows users to browse structured information regarding items of audio content, as well as identify individual items of audio content for purchase and download. Similarly, in exchange for a subscription fee, the Yahoo! Music Engine provides uses with access to a library of structured information regarding items of audio content for browsing and selection of items of audio content for playback, which may include the purchase of items of audio content. Commercial providers of audio content are limited, however, in that each provider is limited to allowing users to search only over a given provider's library of audio content items, without any indication of when items unavailable in a given provider's library are available from an alternative provider. Additionally, audio content providers do not utilize unstructured items of audio content, as well as unstructured information regarding the same, available on the Internet.

In addition to audio content made available for purchase or download from commercial providers of audio content, users may download audio files from servers connected to the Internet. For example, a user may navigate to a given web site that is hosting audio content and select a given item of audio content for download to a local data store for playback. Although the audio content and related information made available on servers connected to a network such as the Internet is unstructured, users may employ general search engines, such as Yahoo! Search, to perform keyword searches through content that the search engine indexes to identify items of audio content. The search engine returns a result set comprising one or more links to files that contain the one or more keywords in the users search, which may, but not necessarily, include audio content. Using a search engine in this manner, however, fails to search across the universe of structured information regarding items of audio content that providers of audio content maintain. Furthermore, there is no targeting of the result set specifically to items of audio content and related information, and the search engine fails to provide for ranking of a result set of a search according to a ranking algorithm chosen dynamically.

In order to overcome shortcomings and problems associated with existing apparatuses and techniques for searching for and retrieving audio content, embodiments of the present invention provide systems and methods for searching both structured and unstructured audio content, including information regarding the same, improving the ranking of searches for audio content, and optimizing search result sets to provide users with access to preferred providers of audio content.

SUMMARY OF THE INVENTION

The present invention provides systems and methods for storing items of audio content and information regarding the same, ranking items of audio content and information regarding the same, and providing access to preferred providers of audio content. According to one embodiment, the invention provides a system and method for presenting a control to navigate to a server for a preferred provider of audio content. The method according to the present embodiment comprises determining a preferred audio provider for a given user and identifying a link to an item of audio content in a result set generated in response to a search by the given user for one or more items of audio content. It is determined if the item of audio content is available at the preferred audio provider for the given user, and, when the item of audio content is available at the preferred audio provider, a control is presented to navigate to a server of the preferred provider from which the user may download the item of audio content.

According to another embodiment, the invention provides a system and method for dynamically ranking links to items of audio content returned to a user in response to the execution of a query by a search engine. The method according to the present embodiment comprises receiving a query to identify links to one or more items of audio content, parsing the query into one or more logical units and determining an annotation for each of the one or more logical units. A ranking heuristic is selected according to the annotation for each of the one or more logical units and a result set is ranked according to the selected ranking heuristic.

Other embodiments of the invention are directed towards a system and method for generating an index comprising structured and unstructured information regarding one or more items of audio content. The method according to the present embodiment comprises receiving unstructured information regarding an item of audio content and indexing the unstructured information. The indexed unstructured information is used as a key to query a data store of structured information regarding the item of audio content, which is used to update the index to include structured information regarding the item of audio content.

BRIEF DESCRIPTION OF THE DRAWINGS

The invention is illustrated in the figures of the accompanying drawings which are meant to be exemplary and not limiting, in which like references are intended to refer to like or corresponding parts, and in which.

DETAILED DESCRIPTION OF THE PREFERRED EMBODIMENT

In the following description of the preferred embodiment, reference is made to the accompanying drawings that form a part hereof, and in which is shown by way of illustration a specific embodiment in which the invention may be practiced. It is to be understood that other embodiments may be utilized and structural changes may be made without departing from the scope of the present invention.

Figure 1:
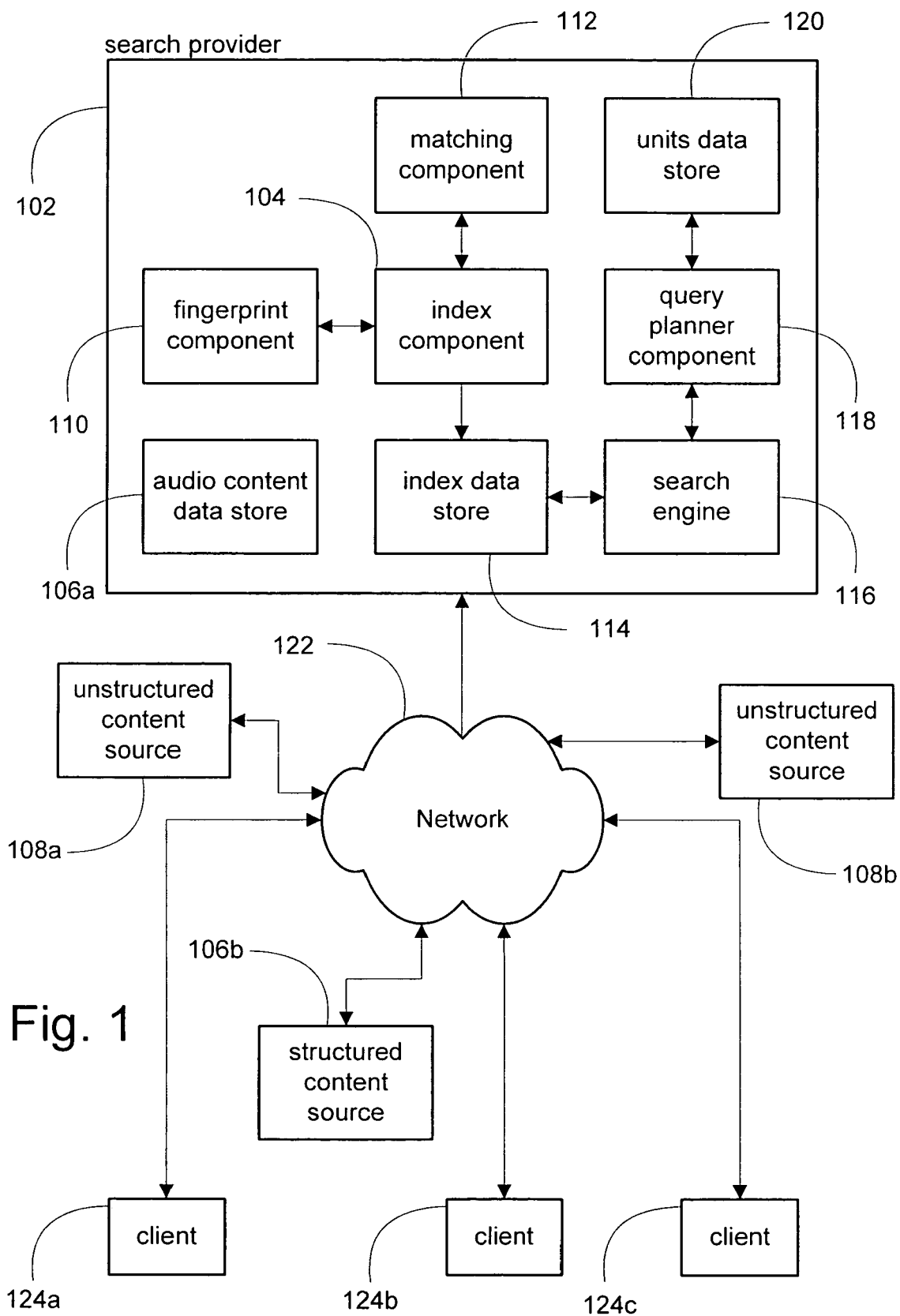
FIG. 1 is a block diagram presenting a system for searching and accessing audio content according to one embodiment of the present invention.

FIG. 1 presents a block diagram illustrating one embodiment of a system for a system for searching and accessing audio content, such as music, podcasts, etc. According to the embodiment of FIG. 1, a search provider 102 comprises one or more software and hardware components to facilitate searching and accessing audio content including, but not limited to, an index component 104, a fingerprint component, 110, a matching component 112, a search engine 116 and a query planner component 118. The search provider 102 also comprises one or more data stores for providing persistent storage of information used in searching and providing access to audio content including, but not limited to, a content data store 106a, an index data store 114 and a units data store 120.

The search provider 102 is communicatively coupled with a network 122, which may include a connection to one or more local and/or wide area networks, such as the Internet. Using the network 122, the search provider 102 is capable of accessing sources of structured 106b and unstructured 108a and 108b audio content, as well as information regarding the same. The search provider 102 communicates with sources of structured and unstructured audio content and information, 106b, 108a and 108b, respectively, for maintaining cached copies of the audio content and information in a content data store 106a. The collection of structured and unstructured audio content and information is referred to as "crawling", and is the process by which the search provider 102 collects information upon which the search engine 116 performs searches. Exemplary methods for crawling information on a network is described in commonly owned U.S. Pat. No. 6,021,409, entitled "METHOD FOR PARSING, INDEXING AND SEARCHING WORLD-WIDE-WEB PAGES," the disclosure of which is hereby incorporated by reference in its entirety.

The search provider 102 crawls structured 106b and unstructured 108a and 108b audio content located on a network 122, such as the Internet, collecting audio content and information regarding the same. An index component 104 parses and indexes audio content and related information that the search provider 102 collects through the crawling process. The index component 104 generates an index that defines a structure for the audio content and related information that allows for location and retrieval of the audio content and related information. According to one embodiment of the invention, the index component 104 creates an index of word-location pairs that allows a search engine 116 to determine specific items of audio content and information regarding the same in response to a query, which may be from a user, software component, automated process, etc. Exemplary methods for indexing information is described in commonly owned U.S. Pat. No. 5,745,889, entitled "METHOD FOR PARSING INFORMATION OF DATABASE RECORDS USING WORD-LOCATION PAIRS AND METAWORD-LOCATION PAIRS," the disclosure of which is hereby incorporated by reference in its entirety. Index information that the index component 104 generates is written to an index data store 114 for persistent storage and use by other components of the search provider 102.

Advantageously, the index that the search provider generates indexes both structured and unstructured audio content and information describing the audio content. Structured content generally refers to audio content and audio content metadata from audio content providers, such as the Yahoo! Music Engine, which maintain available audio content and metadata according to a structured format. For example, maintaining structured audio content and metadata includes maintaining audio content and metadata according to a known structure in a database whereby the metadata is structured according to one or more data fields that may be searched for specific data items. Unstructured content generally refers to audio content and metadata that is not maintained according to a known structure. For example, unstructured audio content and metadata may include one or more items of audio content made available through an FTP server whereby each item of audio content is stored on a file system and metadata for audio content is contained within a given item of audio content as ID3 tags. Accordingly, the search provider provides a unified index in an index data store 114 comprising both structured and unstructured audio content and related metadata whereby a given item of audio content and related metadata may be "layered" with additional information from other data sources to provide a more robust and comprehensive source against which searches may be run.

Because the index in the index data store 114 maintains data regarding audio content from both structured and unstructured sources, a matching component 112 calculates relationships between audio content and related metadata from various sources. According to one embodiment, the search provider 102 collects audio content and metadata from the crawling process and determines if the audio content and metadata is a match with information that the index in the index data store 114 already contains. The matching component also preferably performs "massaging" of metadata for a given item of audio content. Massaging includes, but is not limited to, converting numerals to numbers, removing leading articles (e.g., removing the leading article "The" from "The Rolling Stones") and converting terms in the metadata to their canonical form (e.g., recording the term "morning" when encountering the term "morning").

Where the index identifies an item of audio content from a given artist and the search provider collects a subsequent item of audio content from the given artist, the matching component 112 determines that the two audio items constitute a match on the basis of the artist information associated with each audio item. The matching component 112 informs the index component 104 of the match, which the index component 104 indicates in the index that the index data store 114 maintains. More generally, where the matching component 104 identifies two items of audio content that are a match on the basis of metadata for each of the two items of audio content, the index component 104 indicates the match in the index that the index data store 114 maintains.

In addition to the matching component 112 identifying relationships between items of audio content, the index component 104 is in communication with a fingerprint component 110. The fingerprint component 110 calculates a fingerprint for items of audio content that the index component is writing to the index that the index data store 114 maintains. The fingerprint component 110 provides for the generation of digital fingerprints for items of audio content by deriving unique features that may be used to identify a given item of audio content through comparison with a set of one or more reference fingerprints. Like human beings are able to recognize an item of audio content due to certain characteristics of the audio content, the search provider 102 may recognize previously indexed audio content based on certain signal statistics that comprise the item of audio content's fingerprint. Fingerprints that the fingerprint component 110 generates may be used to identify previously indexed items of audio content to identify relationships between items of audio content, thereby generating a resultant index that identifies audio content and metadata from both structured and unstructured sources.

A search engine 116 receives search requests from client devices 124a, 124b and 124c communicatively coupled to the network 122. A client device 124a, 124b and 124c may be any device that allows for the transmission of search requests to a search provider 102, as well as receipt of ranked result sets from the search provider 102. According to one embodiment of the invention, a client device 124a, 124b and 124c is a general purpose personal computer comprising a processor, transient and persistent storage devices, input/output subsystem and bus to provide a communications path between components comprising the general purpose personal computer. For example, a 3.5 GHz Pentium 4 personal computer with 512 MB of RAM, 40 GB of hard drive storage space and an Ethernet interface to a network. Other client devices are considered to fall within the scope of the present invention including, but not limited to, hand held devices, set top terminals, mobile handsets, etc. The client device 124a, 124b and 124c typically run software applications such as a web browser that provide for transmission of search requests, as well as receipt and display of ranked result sets of audio content and metadata.

When the search engine 116 receives a search request from a given client 124a, 124b and 124c, the search engine 116 investigates the index in the index data store 114 to identify audio content that is responsive to the search that search engine 116 receives. The search engine 116 generates a result set that comprises links to audio content that falls within the scope of the search request. To present the user with the most relevant items in the result set, the search engine 116 ranks the items in the result set. Exemplary systems and methods for ranking search results are described in commonly owned U.S. Pat. No. 5,765,149, entitled "MODIFIED COLLECTION FREQUENCY RANKING METHOD," the disclosure of which is hereby incorporated by reference in its entirety.

In addition to providing novel ranking techniques, the present invention builds on known ranking techniques by calculating information regarding the context of a search of which the search engine 116 is not aware, thereby allowing the search engine 116 to employ different ranking techniques based on the substance of a given search. When the search engine 116 receives a query from a given client 124a, 124b and 124c, the terms in the query are passed to a query planner component 118. The query planner component 118 analyzes the terms in a given query according to information in the units data store 120 to identify logical units that comprise the query. The units data store 120 is populated with information regarding the unit frequency and query frequency for an observed universe of search queries, as well as categorization information for the term. Embodiments of the units data store are described in U.S. Pat. No. 7,051,023, entitled "SYSTEMS AND METHODS FOR GENERATING CONCEPT UNITS FROM SEARCH QUERIES", filed on Nov. 12, 2003, the disclosure of which is hereby incorporated by reference in its entirety. Accordingly, the query planner component utilizes the information in the units data store to calculate the probability that one or more terms are logically related as a unit, as well as a category for the logical unit. For example, where the user transmits the query "garth brooks", the query planner calculates on the basis of information in the units data store that the two terms are related as single logical unit (as opposed to two separate logical units), and that the logical unit is of the type or category of "artist".

The query planner component 118 calculates one or more logical units that a query contains, as well as a category for each of the one or more logical units. The query planner component 118 provides these data to the search engine 116 as logical units and associated annotations indicating a context for a given logical unit. It should be noted that the units data store 120 may not maintain terms found in a query, as well as statistics regarding the same, in which case an annotation is not set and the terms are treated as individual logical units without associated annotations. The search engine 116 executes the query against the index in the index data store 114 according to the logical units that the query planner component 118 provides to generate a result set. The search engine 116 further ranks the result set according to a ranking heuristic chosen on the basis of the annotations that the query planner component 118 returns. For example, where the annotation is "artist", the result set is ranked according to a ranking heuristic associated with "artist". Similarly, where the annotation is "album", the result set is ranked according to a ranking heuristic associated with "album". It is further contemplated that other heuristics may be identified on the basis of combinations of annotations, such as "artist album".

The following example is meant to be illustrative, and not limiting, of the interaction between the search engine 116 and query planner component 118. Assume that the user submits the following query to the search engine 116: garth brooks no fences. The search engine 116 passes the query to the query planner component 118 for processing. The query planner component 116 performs lookups of the terms in the query in the units data store 120, determining that "garth brooks" is a first logical unit and "no fences" is a second logical unit comprising the query. The units data store 120 further comprises categorization information for each of the logical units, e.g., "artist" and "album", respectively. The query planner component 118 returns logical unit and categorization information {("garth brooks")("artist")} {("no fences")("album")} to the search engine.

The search engine 116 executes the query against the index ordered according to the logical units "garth brooks" and "no fences" to generate a result set. The search engine 116 ranks the result set according to a ranking heuristic identified as the "artist album" ranking heuristic on the basis of the annotations that the query planner component 118 returns. The search engine 116 transmits the ranked result set over the network 122 to the client 124a, 124b and 124c for display and interaction. Advantageously, the query planner component 118 provides the search engine 116 with additional context regarding the query that the search engine 116 is unaware of, thereby allowing dynamic ranking of result sets according to the context of a given query.

Figure 2:
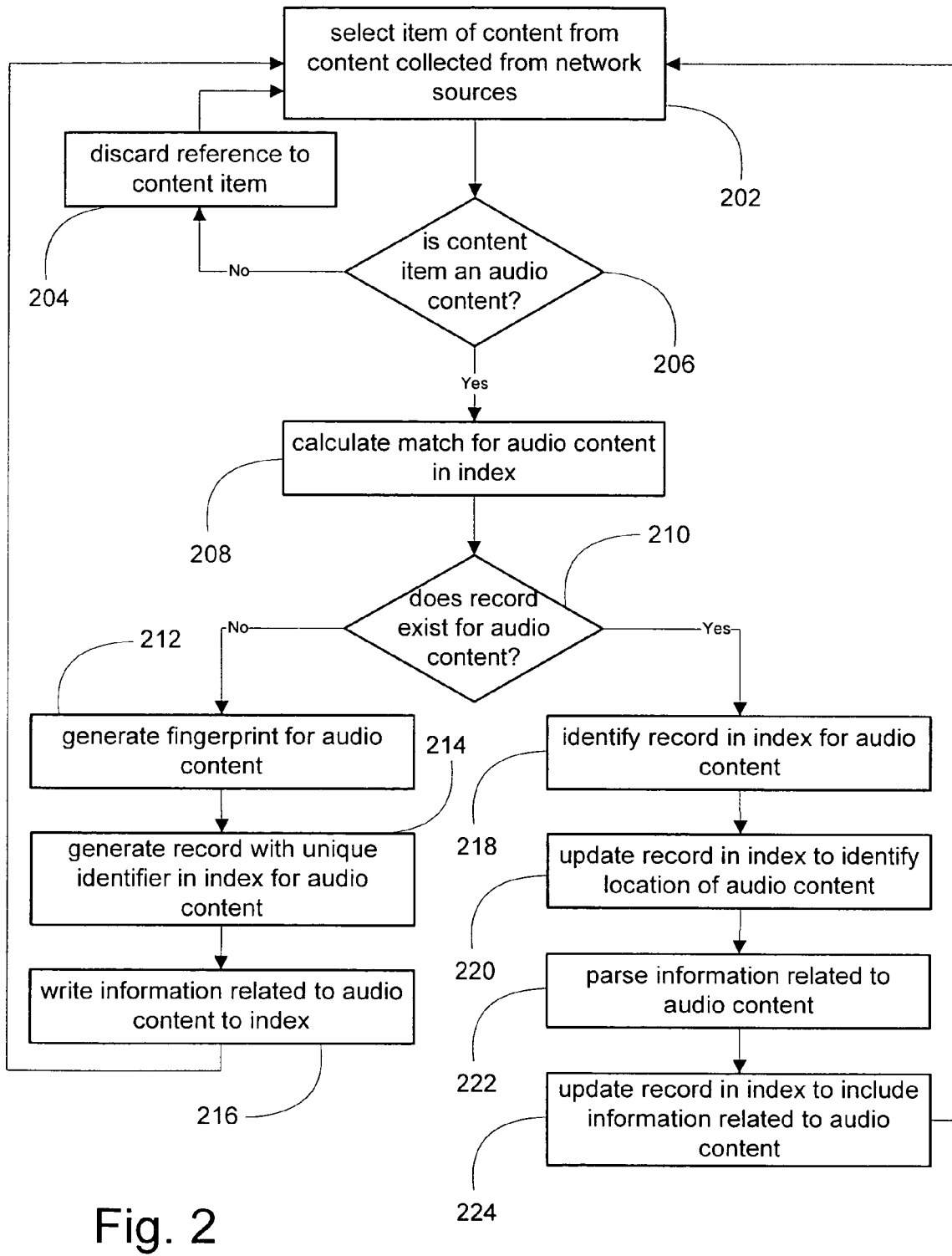
FIG. 2 is a flow diagram presenting a method for collecting audio content and information regarding the same according to one embodiment of the present invention.

One embodiment of a method for using the system of FIG. 1 to collect items of audio content and information regarding the same is illustrated in FIG. 2 according to one embodiment of the present invention. According to the method of FIG. 2, items of audio content are collected from one or more sources on a network, step 202, e.g., the Internet. Selecting items of audio content and information regarding the same may be accomplished as a result of the crawling process in which content, such as audio content, is collected from one or more sources of unstructured audio content. A check is performed to determine if the item of content selected according to step 202 is an item of audio content, step 206. An item of audio content may include any type or source of audio information such as an audio file, a stream of audio information, etc. Where the selected content item is not an item of audio content, step 206, the reference to the content item is discarded, step 204, and a subsequent content item is selected. Accordingly, the method allows for the culling of content that is not audio content.

Where the selected content item is an item of audio content, step 206, a calculation is performed to determine if information regarding the item of audio content matches information regarding other items of audio content that are identified in the index, step 208. For example, where the item of audio content is a song, the match calculation determines whether other songs by the same artist are contained in the index, or whether the same song has previously been entered into the index. A check is performed to determine if the match calculation identifies related items of audio content in the index, step 210.

Where related items of audio content are contained in the index, step 210, the one or more records containing the information regarding the related items of audio content are identified, step 218 and updated with location information that identifies the location or address of the selected item of audio content, step 220. For example, where the selected item of audio content is a song, and a reference to the song is already present in the index, the record for the song in the index is updated to reflect that an additional source for the song is available. Information regarding the selected item of audio content is parsed to identify information regarding the item of audio content, step 222, which is used to update the one or more records in the index to include information regarding the selected item of audio content, step 224. Processing returns to step 202 where another item of content is selected from the set of collected content.

Where the match calculation determines that a record does not exist in the index for the selected item of audio content, step 210, the method contemplates generation of a fingerprint for the item of audio content, step 212. Fingerprinting may be accomplished using any number of techniques that are well known to those of skill in the art. A new record is generated in the index for selected item of audio content, which is assigned a unique identifier, step 214. Information regarding or related to the selected item of audio content is also written to the record in the index for the selected item of audio content, step 216. Processing returns to step 202 where another item of content is selected from the set of collected content.

Figure 3A:
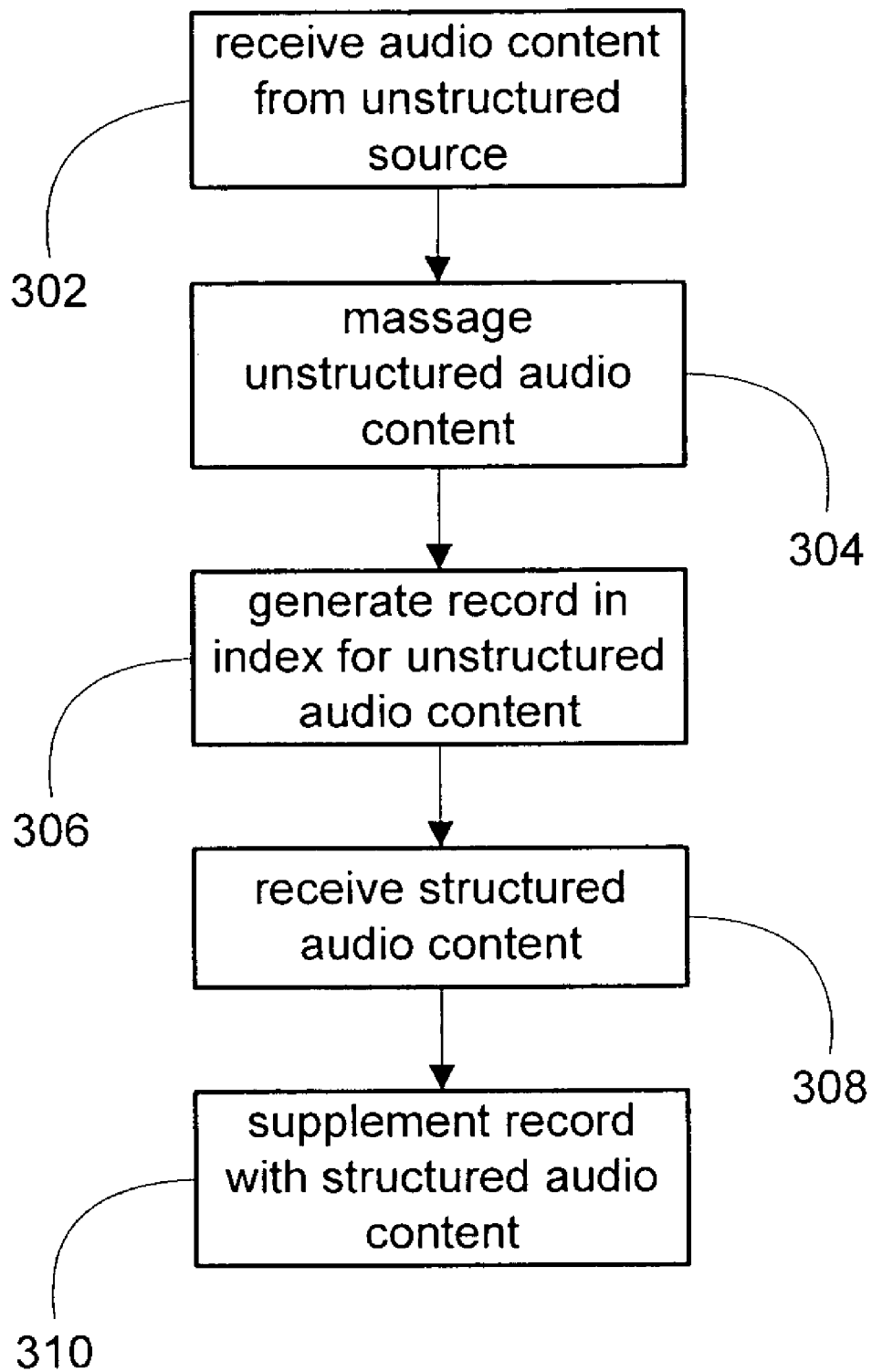
FIG. 3A is a flow diagram presenting a method for matching unstructured content with structured content according to one embodiment of the present invention.

Building on the matching process introduced in FIG. 2, FIG. 3A illustrates a method for matching structured content with unstructured content. According to the method of FIG. 3A, an item of unstructured audio content is received from a source on the Internet, step 302. Information regarding the item of audio content is massaged to "standardize" the information regarding the item of audio content, step 304. As discussed above, massaging may include removing leading articles, recognizing and correcting spelling mistakes, changing information to its canonical form, and other changes to standardize the unstructured information regarding the item of audio content. A record is generated in the index to maintain a reference to the item of audio content received from the network, step 306.

The system of the present invention receives structured information regarding an item of audio content, step 308, e.g., from a commercial provider of audio content. Structured information includes any information regarding an item of audio content that is structured according to defined fields or data items such that individual items of information comprising the structured information may be identified and manipulated. For example, where the system receives information regarding an item of audio content from the Yahoo! Music Engine, it receives structured data as a record comprising one or more fields of data that may be identified and manipulated. A search is performed to identify records that contain information regarding an item of audio content that is unstructured or from an unstructured source, which are supplemented with structured information regarding the item of audio content, step 310. The process of FIG. 3A therefore allows the system to locate an item of audio content and unstructured related information regarding the same and supplement the unstructured information with one or more pieces of structured information regarding the item of audio content from one or more structured sources.

Figure 3B:
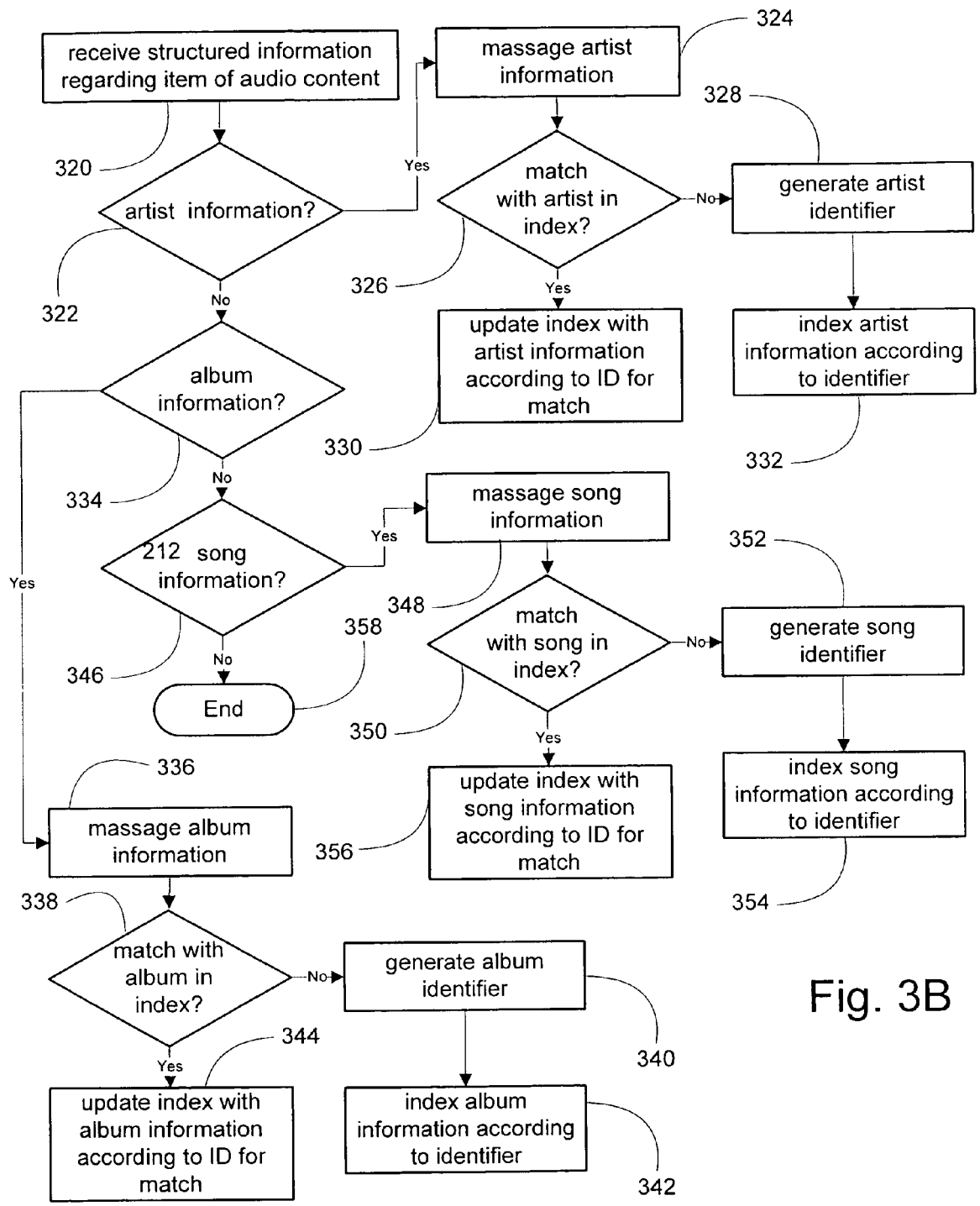
FIG. 3B is a flow diagram presenting a method for indexing structured and unstructured audio content according to one embodiment of the present invention.

FIG. 3B presents a flow diagram presenting an alternative method for associating or matching structured and unstructured information. The method begins with the receipt of structured information regarding an item of audio content, step 320. A check is performed to determine if the structured content comprises artist information, step 322. Where the check evaluates to true, step 322, the artist information is massaged according to techniques discussed herein and known to those of skill in the art. A check is performed to determine if the artist information matches artist information present in the index, step 326. Where the check evaluates to false, an identifier is generated for the performer, step 328, and the artist information is indexed according to the identifier, step 332. Where the check of the index evaluates to true, step 326, the index is updated with artist information according to the identifier for the match, step 330.

A check is also performed to determine if the structured content comprises album information, step 334. Where the check evaluates to true, step 334, the album information is massaged according to techniques discussed herein and known to those of skill in the art. A check is performed to determine if the album information matches album information present in the index, step 338. Where the check evaluates to false, an identifier is generated for the album, step 340, and the album information is indexed according to the identifier, step 342. Where the check of the index evaluates to true, step 338, the index is updated with album information according to the identifier for the match, step 344.

A further check is performed to determine if the structured content comprises song information, step 346. Where the check evaluates to true, step 346, the song information is massaged according to techniques discussed herein and known to those of skill in the art. A check is performed to determine if the song information matches song information present in the index, step 350. Where the check evaluates to false, an identifier is generated for the song, step 352, and the song information is indexed according to the identifier, step 354. Where the check of the index evaluates to true, step 350, the index is updated with song information according to the identifier for the match, step 356.

Where the checks performed at steps 322, 334 and 346 evaluate to false, the method ends. It should be noted by those of skill in the art that where any of the checks at steps 322, 334 and 346 evaluate to true, processing may return to any of the other checks to determine if specific structured information is present in structured information regarding an item of audio content.

Figure 4:
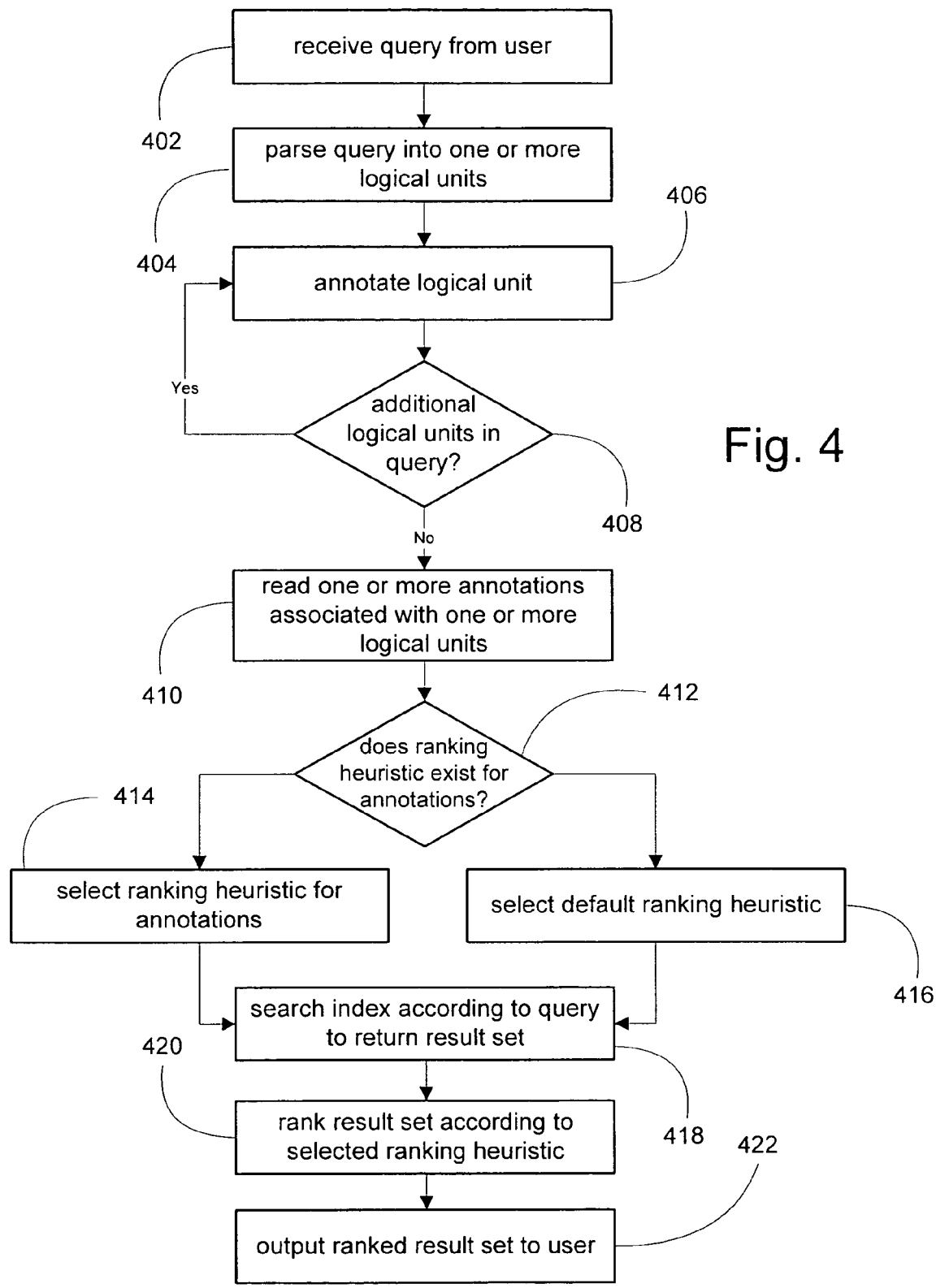
FIG. 4 is a flow diagram presenting a method for providing intelligent ranking of a result of a search for audio content according to one embodiment of the present invention.

Techniques have heretofore been described for collecting and matching structured and unstructured information regarding an item of audio content for storage in an index. FIG. 4 illustrates one embodiment of a method for ranking result sets that result from searches of the index for items of audio content and information regarding the same. According to the embodiment of FIG. 4, the system receives a query from the user to locate one or more items of audio content, step 402. The user's query is parsed into one or more logical units, step 404, by using the terms in the user's query to query a data store that maintains logical units, as well as unit frequency, query frequency and a category. A first logical unit is identified in the query and category information is used to annotate the first logical unit, step 406. A check is performed to determine if additional logical units are present in the user's query, step 408. Where additional logical units are present in the user's query, a subsequent logical unit is selected and annotated 406.

When all logical units in a user's query are annotated, step 408, the annotations associated with the one or more logical units is read to choose an appropriate ranking heuristic, step 410. A check is performed to determine if a ranking heuristic exists for the one or more annotations associated with the one or more logical units, step 412. Where a ranking heuristic exists that is associated with the one or more annotations associated with the one or more logical units, the associated ranking heuristic is selected for ranking of search results, step 414. Where a ranking heuristic does not exist that is associated with the one or more annotations associated with the one or more logical units, or no annotations are identified for the user's query, a default ranking heuristic is selected for ranking of search results, step 416.

A search is performed of the index of audio content and information regarding the same using the user's query, which causes the generation of a result set that comprises information regarding audio content that falls within the scope of the user's query, step 418. The items in the result set are ranked, step 420, according to the ranking heuristic that is selected according to annotations 414 or by default 416. The ranked result set is output to the user for rendering and display on a client device, step 422.

The method of FIG. 4 provides for the dynamic selection of a ranking heuristic to rank items in a result set according to the context of a user's search, e.g., where the user is searching for a song by providing the song title, ranking according to a heuristic specifically tuned for the ranking of song titles. Exemplary ranking heuristics include, but are not limited to, a partner ranking (rank items of audio content available from providers of audio content higher than audio content from unstructured source), a web query ranking (rank items of audio content according to query term frequency), an artist album ranking (rank according to number of albums) and a default ranking. The formula for the calculation of a default ranking is a linear combination of three components: a high boost component, a medium boost component and a low boost component. The formula according to one embodiment of the present invention is illustrated in Table 1:

TABLE 1

Default ranking = 256 * ((A * Highboost) + (B * Mediumboost) + (C * Lowboost))
Highboost = (D * songrating) + (E * durationboost)
Mediumboost = (F * collapsecountboost) + (G * nonclipboost) + (H * releasedateboost) + (I * tracknumberboost) + (J * webqueryboost)
Lowboost = (K * metadataboost) + (L * albumrating) + (M * artistrating)

According to the formula of Table 1: songrating is a measure of the popularity of a given item of audio content as identified by third party structured data sources; durationboost provides a boost to items of audio content that are longer, such as increasing linearly up to five minutes and saturating; collapsecountboost provides a boost based on the number of sources at which an item of audio content may be found; nonclipboost downgrades smaller items of audio content, such as those that are less than 30 seconds in duration; releasedateboost provides a boost to recently released items of audio content on the assumption that users are more interested in newer content (this value may be an exponential function that rapidly decays); tracknumberboost allows results to be sorted by track number; webqueryboost provides a boost to more popular items of audio content by collecting general search results based on metadata for the item of audio content and calculates the boost on the basis of the size of the result set; metadataboost provides a boost to items of audio content with more complete metadata; albumrating uses rating information from third party structured data sources to calculate the popularity of an item of content; a similar calculation is performed for artistrating.

Figure 5:
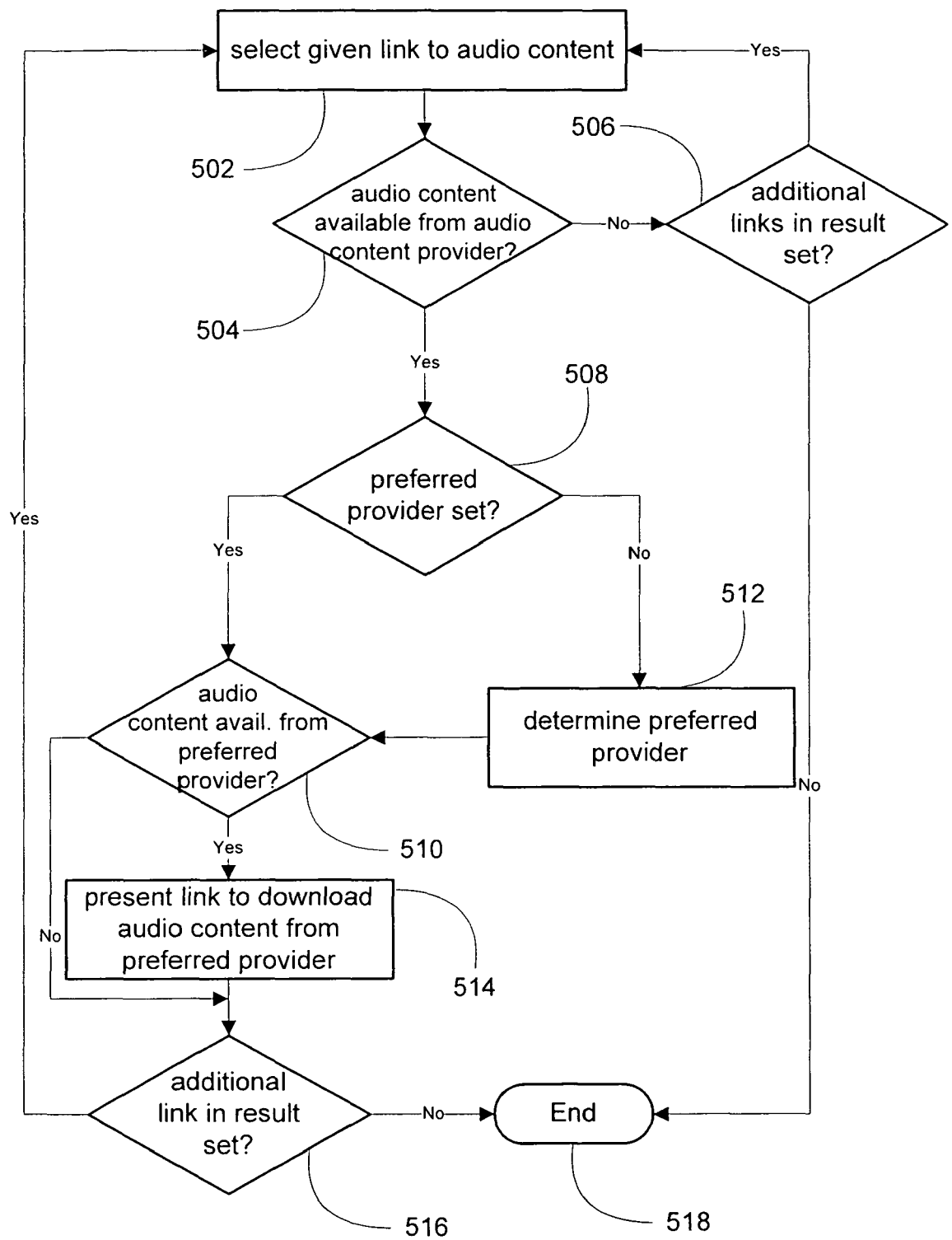
FIG. 5 is a flow diagram presenting a method for providing a link to a preferred provider for an item of audio content in a result set according to one embodiment of the present invention.

Result sets that are responsive to a user's query, which may be ranked, may include links to a preferred provider of an item of audio content identified in a result set. FIG. 5 illustrates one embodiment of providing links to navigate to a preferred provider of an item of audio content. According to the method illustrated at FIG. 5, a result set is traversed and a reference to a given item of audio content is selected, step 502. A check is performed to determine if the item of audio content identified by the reference is available from one or more providers of audio content, step 504, e.g., Yahoo! Music Engine. Where the item of audio content is not available from any provider of audio content, step 504, a check is performed if additional references to items of audio content are contained in the result set, step 506. If additional references are present, processing returns to step 502 with the selection of a subsequent reference, otherwise processing ends, step 516.

Returning to step 504, where the item of audio content is available from a provider of audio content, a check is performed to determine if a user's preferred provider of audio content is set in a user profile, step 508. Where no provider is set, the system may determine a preferred provider of audio content for the user, step 512. According to one embodiment of the invention, a default preferred provider of audio content is set for the user. Alternatively, the system may perform a scan of a user's client device for applications designed for accessing audio content from providers of audio content and select a given provider of audio content on the basis of the installed client applications.

Regardless of the specific techniques, a preferred provider of audio content is set for the user, and a check is performed to determine if the item audio content identified by the reference is available from the preferred provider of audio content, step 510. Where the item of audio content is available from the preferred provider of audio content, the system presents a link to navigate to the preferred provider of audio content for download or playback of the item of audio content, step 514. According to embodiments of the invention, the link causes the execution of a client application for accessing the preferred provider of audio content and passes the application parameters that allow for the direct navigation within the client application to the item of audio content. Where the item of audio content is not available from the preferred provider of audio content, step 510, or after the link is presented, step 514, a check is performed to determine if additional references to items of audio content are contained in the result set, step 516. If additional references are present, processing returns to step 502 with the selection of a subsequent reference, otherwise processing ends, step 516.

Figure 6:
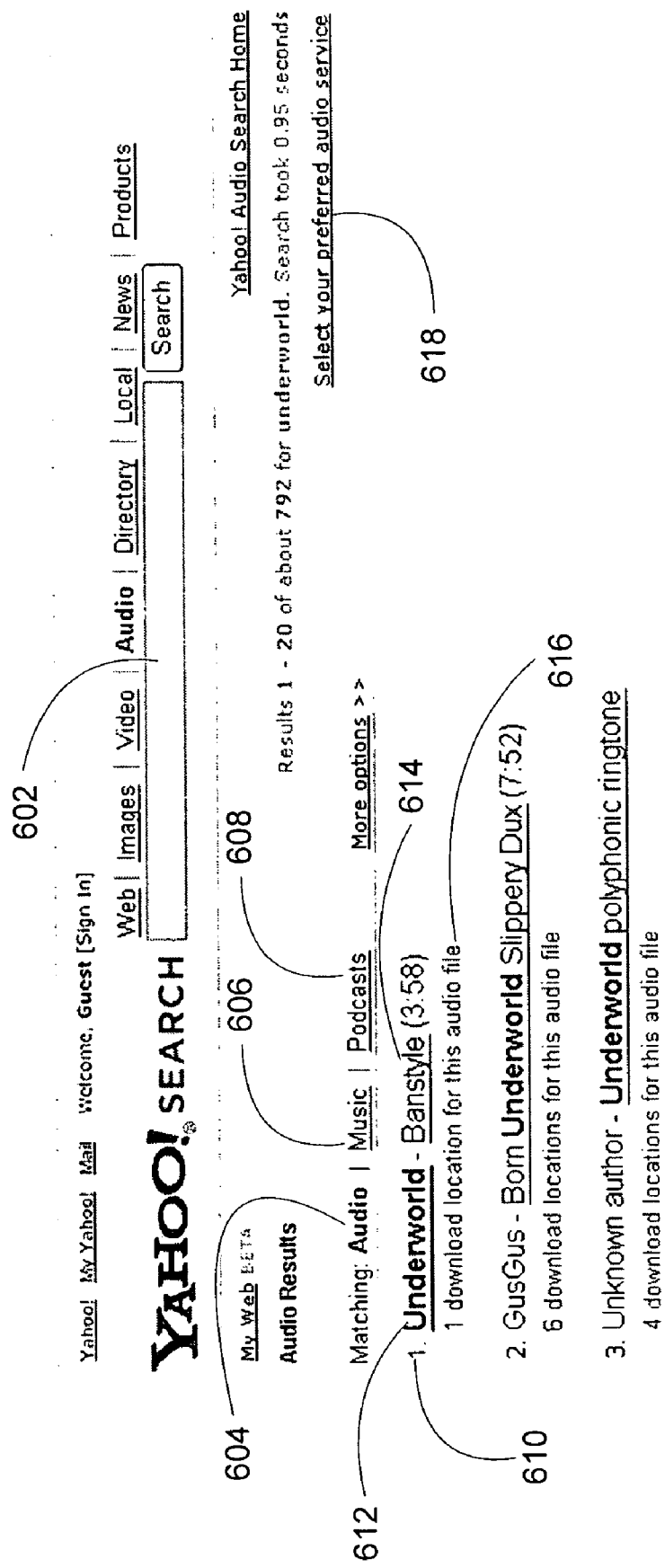
FIG. 6 is a screen diagram presenting a user interface for browsing and accessing all audio items in a result set according to one embodiment of the present invention.

FIGS. 6 though 10 present screen diagrams illustrating embodiments of user interfaces for accessing the systems and methods of the present invention. FIG. 6 illustrates the presentation of a result set containing all categories of audio 604 content in a result set without restrictions. According to one embodiment, the results in a result set for all audio are ranked according to a default ranking heuristic. The interface provides controls restricting the result set to items of audio content that are music 606 or podcasts 608. The result set is presented according to a rank value 610 that is assigned to each item of audio content identified in the result set. Each item in the result set comprises artist and title information, 612 and 614, respectively, as well as the number of locations 616 from which the user may download the item of audio content, which includes audio content and related information from structured and unstructured content sources. The interface also provides controls for formulating a new query 602 and for navigating to an interface for setting a preferred provider of audio content 618.

Figure 7:
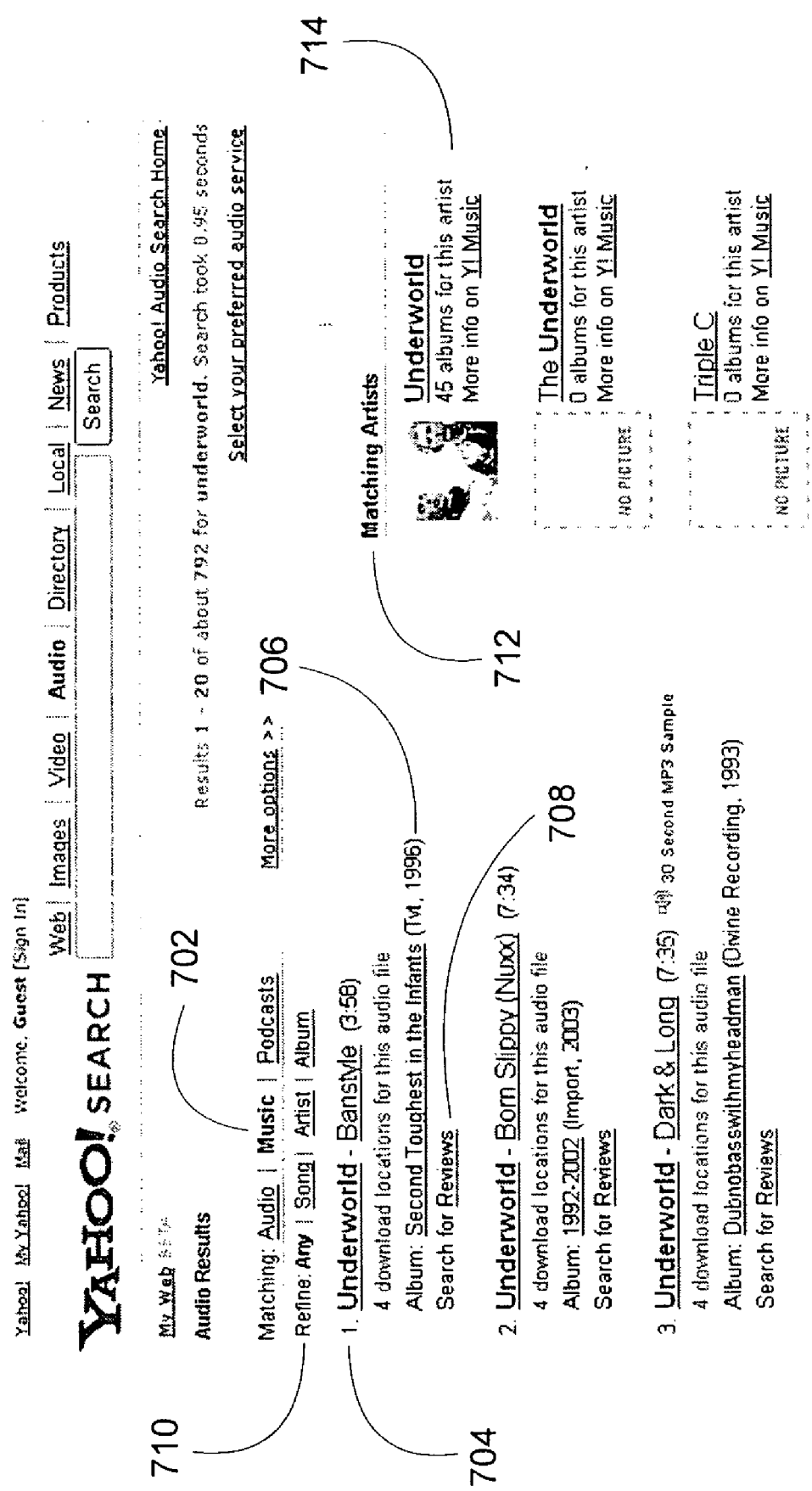
FIG. 7 is a screen diagram presenting a user interface for browsing and accessing music audio items in a result set according to one embodiment of the present invention.

When a user interacts with the interface of FIG. 6 to restrict the results in the result set to music 606, the system presents the user interface illustrated in FIG. 7. As is seen in the interface of FIG. 7, the music restriction 702 is indicated as being selected. Because the interface is presenting music audio content, the interface provides additional controls to further refine the result set 710 according to specific information regarding an item of music audio content. The items of music audio content are presented to the user according to a rank 704, as well as a link 706 to an album interface for a given song and reviews 708, which is another example of the matching of structured and unstructured information regarding an item of audio content. Along a right rail portion 712 of the interface, one or more artists 714 that match the user's query are presented. Advantageously, the ranking heuristic used to rank an item in the result set 704 may be dynamically selected based on the context of the user's query, which may also be different than the ranking heuristic used to rank album information 712 in the right rail portion 712 of the interface.

Figure 8:
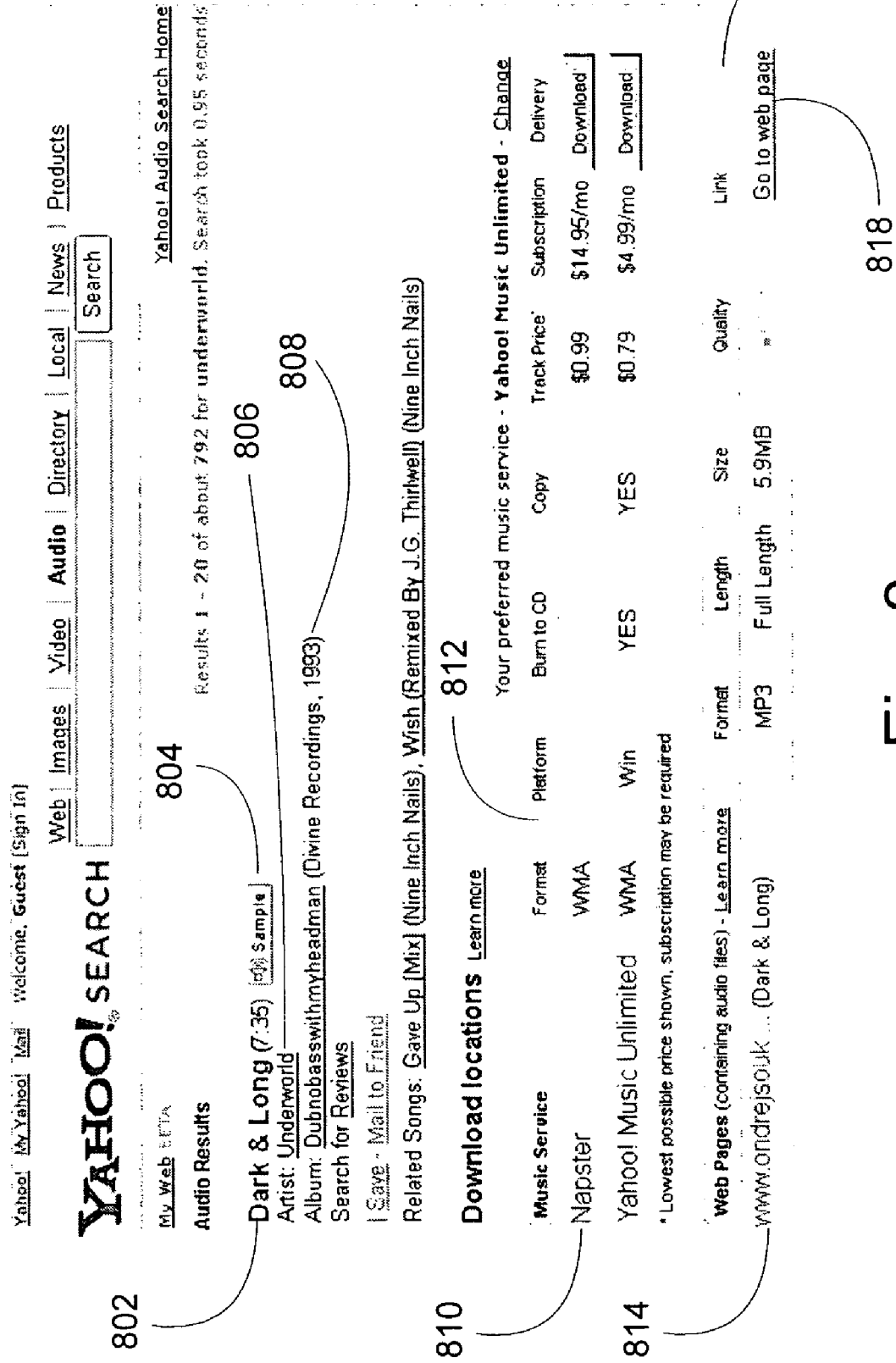
FIG. 8 is a screen diagram presenting a user interface for accessing a selected audio item from either audio provider or Internet sources according to one embodiment of the present invention.

When the user selects a given link in the result set 712, the system provides the user with a download page for the item of audio content identified by the link. FIG. 8 presents a screen diagram illustrating a user interface for downloading an item of audio content. The download page identifies the title of the item of audio content 802, artist 806 and album 808. During the crawling process discussed herein, copies of items of audio content may be cached at the search provider, which the user may sample by selecting a given control 804. Alternatively, selection of the sample control 804 may directly access the item of audio content from its source to provide a sample. The interface further provides download locations from structured sources made available by providers of audio content 810, as well as from unstructured sources located on the Internet 814. Extended information is provided for items of audio content available from structured and unstructured sources, 812 and 816, respectively.

Figure 9:
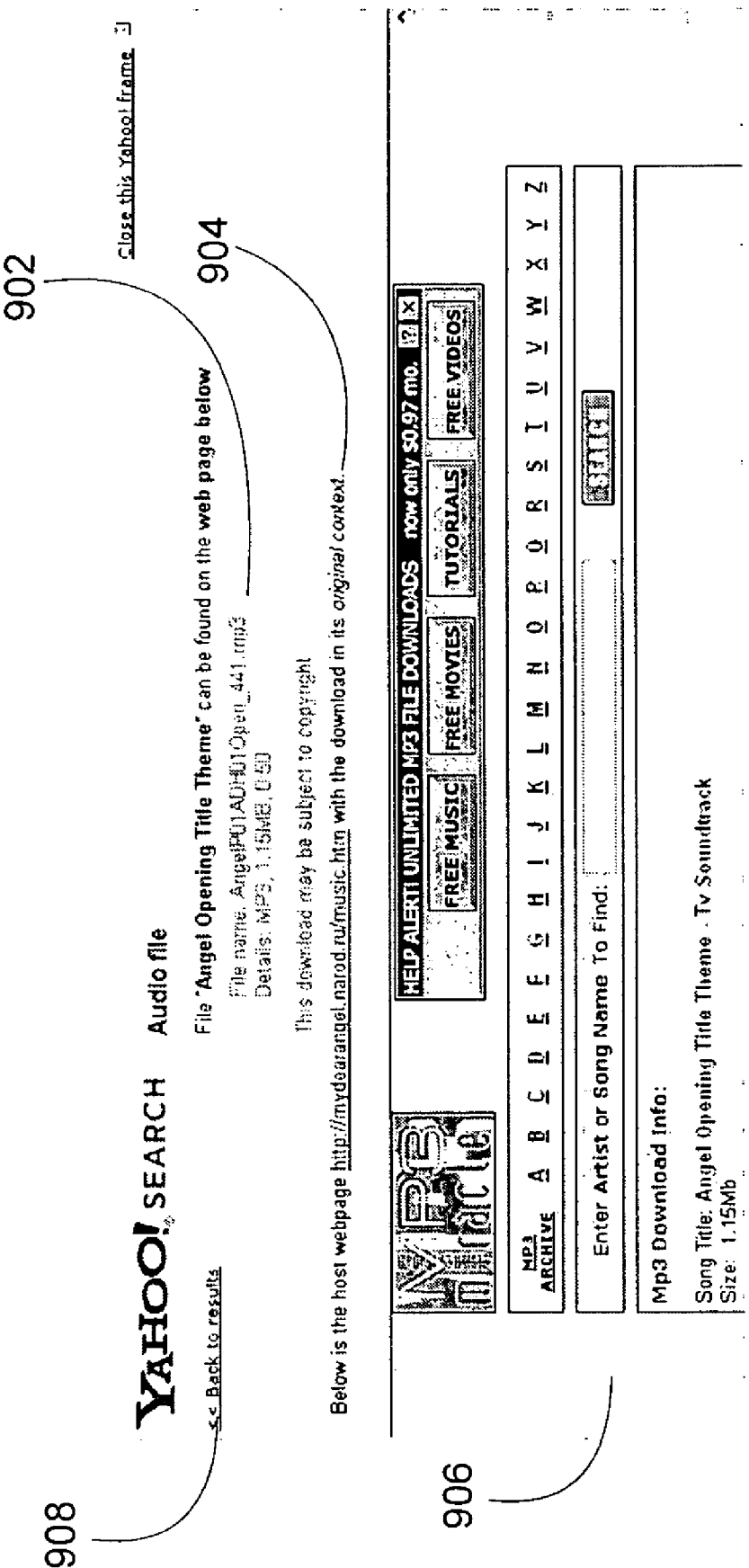
FIG. 9 is a screen diagram presenting a user interface for setting a preferred provider of audio content according to one embodiment of the present invention.
Figure 10:
FIG. 10 is a screen diagram presenting a user interface for accessing an Internet source for a given item of audio content according to one embodiment of the present invention.

Selection of a control 818 to navigate to an item of audio content located on the Internet causes the system to load the interface of FIG. 9. The interface of FIG. 9 presents detailed information regarding the item of audio content 902, such as file name, file type, and file size. A link is provided to directly view the location that is the source of the item of audio content 904 as opposed to viewing the source in a window 906. A control allows the user to navigate back 908 to the interface displaying the result set of the search.

While the invention has been described and illustrated in connection with preferred embodiments, many variations and modifications as will be evident to those skilled in this art may be made without departing from the spirit and scope of the invention, and the invention is thus not to be limited to the precise details of methodology or construction set forth above as such variations and modification are intended to be included within the scope of the invention.

We claim:

1. A method for presenting a control to navigate to a server for a preferred provider of audio content, the method comprising:
   identifying a first link to an item of audio content in a result set generated in response to a search by a given user for one or more items of audio content, wherein the item of audio content is available from a list of audio providers;
   presenting the first link to the item of audio content;
   determining a preferred audio provider from the list of audio providers for the given user based on the user profile;
   determining one or more installed applications associated with the given user configured to access audio content from one or more given audio providers;
   if there is no preferred audio provider based on the user profile, assigning a user a default preferred audio provider based on the determination of one or more installed applications configured to access audio content from the one or more given audio providers;
   determining if the item of audio content is available at the preferred audio provider for the given user;
   if the item of audio content is available at the preferred audio provider, presenting a second link as a control to navigate to a server of the preferred audio provider from which the item of audio content may be downloaded by or streamed to the given user; and
   if the item of audio content is not available at the preferred audio provider, presenting an alternative link to the item of audio content from an alternative audio provider from the list of audio providers.

2. The method of claim 1 wherein identifying a first link to an item of audio content comprises identifying references to items of audio content and audio provider information retrieved from an audio content index.

3. The method of claim 1 wherein identifying a first link to an item of audio content comprises:
   traversing the result set; and
   selecting a reference to a given item of audio content and determining if the item of audio content identified by the reference is available from a preferred audio provider.

4. The method of claim 1 wherein determining a preferred audio provider for a given user comprises reading a given user's preferred audio provider from a user profile.

5. The method of claim 1 wherein determining a preferred audio provider for a given user comprises:
   determining a presence of one or more client applications residing on a client device used to access audio content; and
   selecting a preferred audio provider based upon one of the one or more applications on the client device.

6. The method of claim 1 wherein determining if the item of audio content is available at the preferred audio provider comprises traversing the result set to select a reference to an item of audio content offered by a user's preferred audio provider.

7. The method of claim 1 comprising:
   executing a client application; and
   passing the client application address parameters for direct navigation to an item of audio content.

8. The method of claim 7 comprising playing the item of audio content for the user.

9. A system for presenting a control to navigate to a server for a preferred provider of audio content, the system comprising:
   a server coupled to a client device via a network, the server comprising:
   a user profile identifying a preferred audio provider from a list of audio providers for a given user based on a preferred audio provider stored therein, the user profile further operative to identify one or more installed applications associated with the given user configured to access audio content from one or more given audio providers, and if a preferred audio provider is not stored therein, a default preferred audio provider assigned thereto based on the identification of one or more installed applications configured to access audio content from the one or more given audio providers;
   a search engine operative to receive the user profile and identify a first link to an item of audio content in a result set generated in response to a search being available from the preferred audio provider for the given user, wherein the item of audio content is available from the list of audio providers, the search engine further operative to provide a second link as a control for navigating to a server of the preferred audio provider from which the item of audio content is available after a presentation of the first link to the item of audio content, if the item of audio content is not available at the preferred audio provider, provide an alternative link to the item of audio content from an alternative audio provider from the list of audio providers, and
   the search engine operative to provide the second link or the alternative link as the control for navigating to a server of the preferred audio provider or the alternative audio provider from which the item of audio content may be downloaded by or streamed to the given user.

10. The system of claim 9 wherein the result set comprises links to one or more items of audio content.

11. The system of claim 9 wherein the search engine is operative to traverse the result set comprising references to items of audio content and provide a control for navigating to a server of the preferred audio provider for each item in the result set available from the preferred audio provider.

12. The system of claim 9 wherein the search engine is operative to select a reference to an item of audio content in a result set offered by a given user's preferred audio provider.

13. The system of claim 9 wherein the search engine is operative to select an alternative reference to an item of audio content in a result set when no reference is contained in the result set to an item of audio content offered by a given user's preferred audio provider.

14. The system of claim 9 wherein the first link is configured to provide an application executing on the client device with one or more parameters for directly navigating to a provider of audio content.

15. The system of claim 9 wherein the client device receives the second link to the server of the provider of audio content and executes an application on the client device for navigating to an audio content provider to download or stream an item of audio content.

16. A computer program embodied on a computer-readable medium for providing an application program interface for presenting a control to navigate to a server for a preferred provider of audio content, the computer program comprising:
   program code to identify a first link to an item of audio content in a result set generated in response to a search by a given user for one or more items of audio content, wherein the item of audio content is available from a list of audio providers;
   program code to present the first link to an item of audio content;
   program code to determine a preferred audio provider from the list of audio providers for the given user based on the user profile;
   program code to determine one or more installed applications associated with the given user configured to access audio content from one or more given audio providers;
   if there is no preferred audio provider based on the user profile, program code to assign the given user a default preferred audio provider based on the determination of one or more installed applications configured to access audio content from the one or more given audio providers;
   program code to determine if an item of audio content is available at the preferred audio provider for the given user;
   program code to present a second link as a control to navigate to a server of the preferred audio provider from which the item of audio content may be downloaded by or streamed to a user if the audio content is available at the preferred audio provider; and
   program code to present an alternative link to the item of audio content from an alternative audio provider from the list of audio providers if the item of audio content is not available at the preferred audio provider.

17. The computer program embodied on a computer-readable medium of claim 16 comprising program code for identifying references to items of audio content and provider information retrieved from an audio content index.

18. The computer program embodied on a computer-readable medium of claim 16 comprising program code for traversing a result set and selecting a reference to a given item of audio content to determine if the item of audio content identified by the reference is available from a preferred audio provider.

19. The computer program embodied on a computer-readable medium of claim 16 comprising program code for reading a given user's preferred audio provider from a user profile.

20. The computer program embodied on a computer-readable medium of claim 16 comprising:
    program code for determining a presence of one or more client applications residing on a client device used to access audio content; and
    program code for selecting a preferred provider based upon one or more applications on a client device.

21. The computer program embodied on a computer-readable medium of claim 16 comprising program code for traversing the result set to select a reference to an item of audio content offered by a user's preferred provider.

22. The computer program embodied on a computer-readable medium of claim 16 comprising program code for delivering a link and parameters to a client device to invoke a client application and provide direct navigation to an item of audio content.

23. The method of claim 1 further comprising:
    determining an alternative audio provider where the item of audio content is not available at the preferred audio provider.

24. The computer program embodied on a computer-readable medium of claim 16 comprising program code for determining an alternative audio provider when the computer program determines the item of audio content is not available at the preferred audio provider.

* * * * *